Fig.4

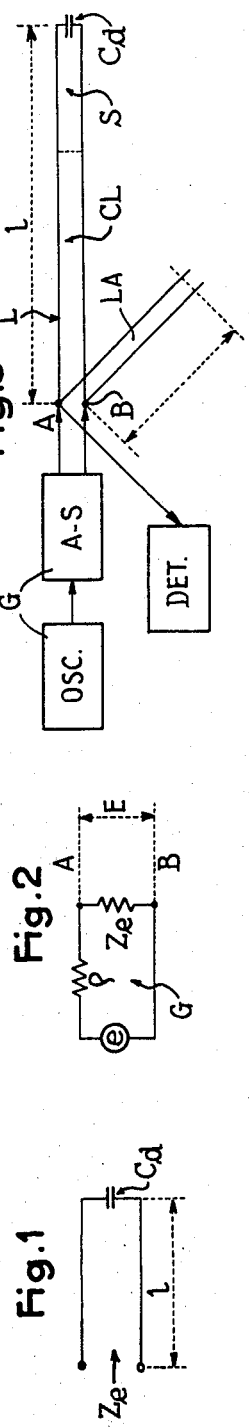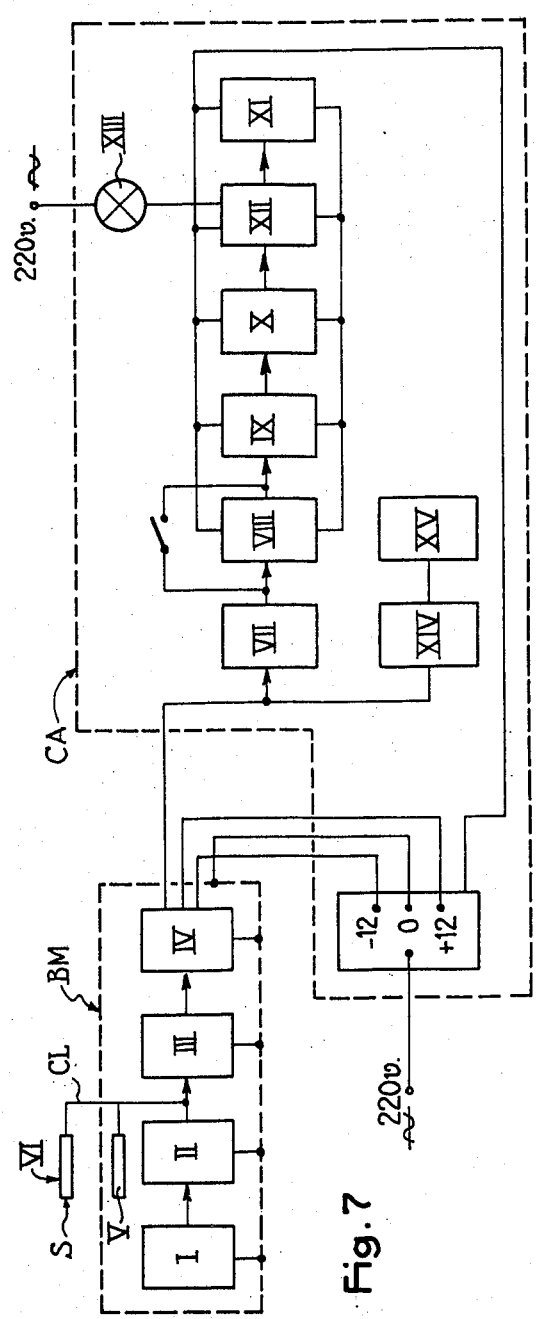

Nov. 18, 1969  D. DA COSTA VIEIRA  3,478,586
SENSING DEVICE HAVING A VARIABLE IMPEDANCE AND THE APPLICATION
THEREOF TO AN APPARATUS FOR SUPERVISING FROM A DISTANCE
THE LEVEL OF OIL IN A TANK
Filed May 22, 1967  4 Sheets-Sheet 3

United States Patent Office

3,478,586
Patented Nov. 18, 1969

3,478,586
SENSING DEVICE HAVING A VARIABLE IMPEDANCE AND THE APPLICATION THEREOF TO AN APPARATUS FOR SUPERVISING FROM A DISTANCE THE LEVEL OF OIL IN A TANK
David Da Costa Vieira, Aix-en-Provence, France, assignor to Commissariat à l'Energie Atomique, Paris, France, a corporation of France
Filed May 22, 1967, Ser. No. 640,229
Claims priority, application France, May 31, 1966, 63,527
Int. Cl. G01f *23/22*
U.S. Cl. 73—304      10 Claims

ABSTRACT OF THE DISCLOSURE

A device for sensing and measuring fluctuations in the level of a liquid, comprising a probe having at one end a sensing element immersed in the liquid, the sensing element having an impedance which varies with variations in the level of the liquid in the sensing element, means being provided which are responsive to the variations in the impedance of the sensing element.

---

The invention relates to a sensing and measuring device of the type comprising a sensing probe or like detecting means having a variable impedance, this impedance being a function of the magnitude to be sensed or measured.

The invention more particularly relates to devices of this type in which the probe comprises, owing to the conditions of utilization, a sensing element of small volume connected by a connecting cable to an electronic system which detects the variations in the impedance, this cable having if desired a length exceeding several decimetres or even several metres. The probe can be for example of the type having a variable capacity. In this case, it is necessary to sense a very small variation in capacity (on the order of 1 pf.) relative to a large capacity due to the cable. With conventional sensing devices, this sensing gives rise to difficulties inherent in the instability of the capacity of the cable and it is usually impossible to sense with complete reliability variations in capacity less than a few hundredths of that of the connecting cable.

The object of the invention is to provide a device of the type defined hereinbefore, which permits the sensing of much smaller variations.

The probe can be for example responsive to the level of the oil contained in a tank. The device according to the invention can then be applied to an apparatus supervising or measuring this level from a distance, whereby it is possible to signal from a distance the variations in this level and set off an alarm when the absolute value of a variation exceeds a given warning or danger value, irrespective of the cause of this variation.

The device the provision of which constitutes one of the objects of the invention, comprises in combination an oscillation generator, a probe having a variable impedance varying as a function of the variations in the magnitude to be detected, said probe being connected to one end of a connecting cable which connects it to the output of said generator, an auxiliary line having an adjustable impedance also connected to the output of the generator, and means for receiving at said output the variable voltage thus produced.

The supervising and measuring apparatus, the provision of which constitutes another object of the invention, comprises in combination on one hand a sensing device having a variable impedance such as that defined hereinbefore in which the element having a variable impedance is a capacitor of small volume the plates of which are separated by air or oil depending on whether the capacitor is immersed or not, the variation in the nature of the dielectric determining the variation in the capacity, and said apparatus further comprising a signaling or measuring indicator, and electronic means controlled by said sensing device for actuating alarm and/or operating means when the variable voltage produced by said device exceeds a given value.

Further features and advantages of the invention will be apparent from the ensuing description, with reference to the accompanying drawings.

In the drawings:

FIGS. 1 and 2 are explanatory diagrams of the principle of the invention;

FIG. 3 is a general diagram of the sensing device;

FIG. 4 is a detailed diagram of this device;

FIG. 7 is a general diagram of one embodiment of the oil level supervising apparatus.

Figure 6:
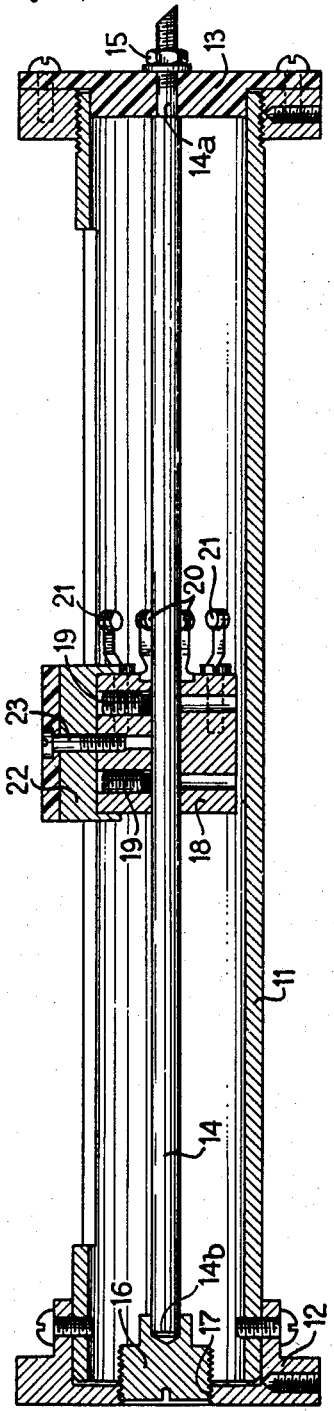
FIGS. 5 and 6 are axial sectional views of one embodiment of a probe having a variable capacity and of a line having an adjustable impedance respectively employed in the device shown in FIGS. 3 and 4.

The principle of the sensing device according to the invention is based on the following theoretical considerations. In order to render the explanation more clear, it will be assumed that the probe is of the type having a variable capacity. The small variations to be revealed are those of this capacity.

The assembly consisting of the sensing capacity and its connecting cable is equivalent to a line L having a length $l$ whose input impedance $Z_e$ (see FIG. 1) is a function of the value of the sensing capacity $C_d$.

Assuming that the weakening due to the line is negligible, there is obtained with the conventional notations:

$$Z_e = \frac{Z_R + jZ_o \tan \beta l}{Z_o + jZ_R \tan \beta l} \quad (1)$$

wherein $Z_R$ is the impedance of $C_d$, $Z_c$ is the characteristic impedance of the line and $\beta = \omega\sqrt{LC}$, L being the inductance of the line by unity of length and C being the capacitance between conductors or between one conductor and the earth by unity of length.

If the line thus formed is connected to a voltage generator G (see FIG. 2) having an internal resistance of value $\rho$, there is obtained at the terminals A, B of this generator a voltage E which is a function of $Z_e$.

Since the invention aims at making a discrimination of $C_d$ between two values $C_{d1}$ and $C_{d2}$, two particular values of $Z_e$, hereinafter termed $Z_{e1}$ and $Z_{e2}$, corresponding respectively to the values $C_{d1}$ and $C_{d2}$ will be chosen, it being required that the difference between these two values of $Z_e$ be as great as possible so that the voltage variations between the terminals A and B be as great as possible.

The value of $Z_{e1}$ can be made 0 and in this case the Equation 1 gives:

$$\tan \beta l = \frac{-Z_{R1}}{jZ_o} \quad (2)$$

which defines a length of line.

When $C_{d1}$ varies by $\Delta C$, $Z_e$ has a value $$Z_{e1} + \Delta Z_e$$

which according to Equation 1 is equal to $$\frac{Z_{R1}+\Delta Z_R+jZ_c \tan \beta l}{Z_c+j(Z_{R1}+\Delta Z_R)\tan \beta l}Z_c$$

whence, since $Z_{e1}=0$:

$$\Delta Z_e = \frac{Z_c \cdot \Delta Z_R}{Z_c-(Z_{R1}+\Delta Z_R)\frac{Z_{R1}}{Z_c}}$$

$$=Z_c^2 \frac{\Delta Z_R}{(Z_c^2-Z_{R1}^2)\left(1+\frac{Z_{R1}\Delta Z_R}{Z_c^2-Z_{R1}^2}\right)}$$

If it is assumed $$\frac{Z_{R1}\cdot \Delta Z_R}{Z_c^2-Z_{R1}^2} \ll 1$$

there is obtained:

$$\Delta Z_e = \frac{Z_c^2}{Z_c^2-Z_{R1}^2}\cdot \Delta Z_R$$

If $Z_c^2$ is much greater than $Z_{R1}^2$, there is obtained substantially:

$$\Delta Z_e = \Delta Z_R$$

Supposing that, with the conventional notation:

$$Z_{R1}+=\frac{1}{jC_{d1}\omega} \text{ and } Z_{R1}+Z_R=\frac{1}{j\omega(C_{d1}+\Delta C)}$$

there is formed:

$$Z_{R1}+\Delta Z_R=\frac{1}{jC_{d1}\omega\left(1+\frac{\Delta C}{C_{d1}}\right)}$$

and if it is supposed that $\Delta C$ is very small relative to $C_{d1}$, there is finally obtained:

$$\Delta Z_R=\frac{1}{jC_{d1}\omega}\cdot \frac{\Delta C}{C_{d1}}$$

There is available therefore an equivalent input impedance of a reactive (capacitive or inductive) line, depending on the sign of $\Delta C$ having for value:

$$\Delta Z_e = \pm \frac{1}{jC_{d1}\omega}\left|\frac{\Delta C}{C_{d1}}\right| \quad (3)$$

and, when $C_d$ has the values $C_{d1}$ and $C_{d2}$, this impedance has respectively the values:

$$Z_{e1}=0 \text{ owing to the Equation 2}$$

and $$Z_{e2}=\frac{1}{jC_{d1}\omega}\cdot \frac{C_{d2}-C_{d1}}{C_{d1}}$$

owing to Equation 3.

In order to increase the value of $Z_{e2}$ when $C_{d2}$ only slightly differs from $C_{d1}$, a second line is connected in parallel with the input impedance which terminates in an adjustable short circuit so as to have an input impedance $Z_e'$ for this line. The impedance Z resulting from the assembly is given by the equation:

$$\frac{1}{Z}=\frac{1}{Z'_e}+\frac{1}{Z_{e2}}$$

Making:

$$Z_e'=-Z_{e2}$$

an infinite value for Z is obtained theoretically.

A voltage generator is therefore finally produced with which there is obtained theoretically:

When $C_d=C_{d1}$, a short circuit between the output terminals A and B of the generator;

With the utilization of an adjusted auxiliary line, an infinite impedance between these terminals.

It is obvious that it is not possible to obtain these results in practice. However, this device permits the obtainment of a difference of potential between A and B which varies for example from 0.7 to 2.4 when the $C_d$ value varies from about 1.5 to 2.5 pf. with a connecting cable 3 meters long.

One embodiment of the sensing device according to the invention is shown generally in FIG. 3. This device comprises in particular a sensing capacitor $C_d$ fixed to the end of a probe S which is connected to a connecting cable CL, the probe and the cable being the equivalent of a line L having a length $l$.

Whose free end is connected to the output terminals A, B of a generator having a high-frequency oscillator OSC (for example 16 MHz.) and an amplifying-separating stage A-S which amplifies the HF signal of the oscillator for connection to the probe and separates the oscillator from the rest of the circuit so as to match the output impedance. A detection stage DET converts the HF signal into a continuous signal adapted to be transmitted for example to an indicating or alarm device. Connected between the points A and B is an auxiliary coaxial line LA with an adjustable short circuit, which can be considered as an inductance at the measuring point.

This device is fed by a 12 v. D.C. source of electricity (not shown in this diagram).

Figure 4:
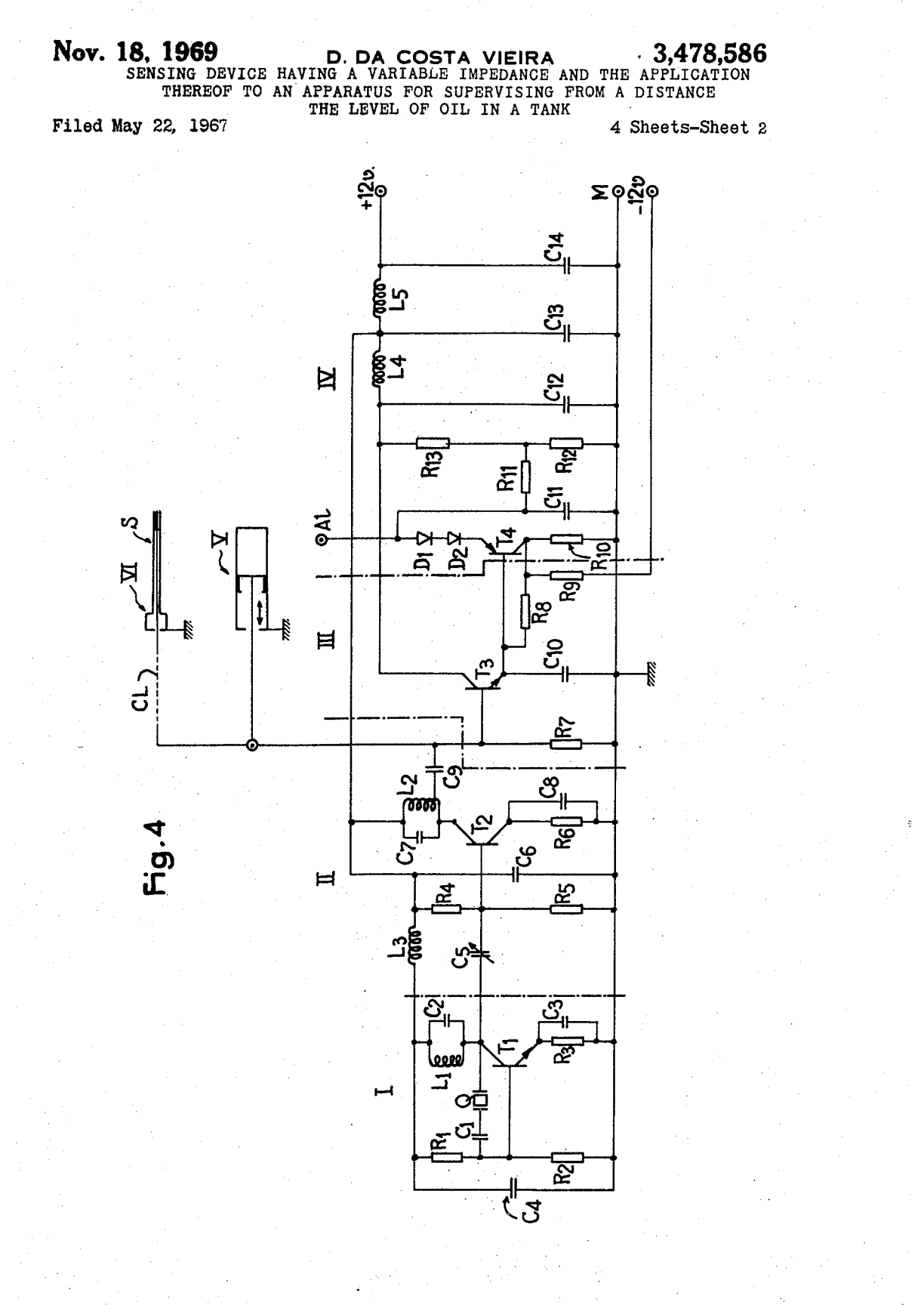

The detailed descriptions of these various parts will be given hereinafter with reference to the diagram shown in FIG. 4.

There can be seen in this circuit diagram four parts which are separated from one another in the diagram by dot-dash lines, namely: an oscillator circuit I, an amplifying-separating stage circuit II, a detection stage or circuit III and a low-frequency output circuit IV. This assembly can be enclosed in a "measuring box" which also contains the auxiliary line V having an adjustable impedance to which can be connected the movable assembly VI consisting of the probe S and the connecting cable CL therefor.

The circuit I comprises mainly a quartz oscillator Q of the Colpitts type having a transistor T1 of the NPN type. This circuit operates at the frequency of 60 MHz. as mentioned hereinbefore.

This circuit I is connected to the circuit II by means of a variable capacitor C5 which permits the regulation of the output level. In the circuit II, the HF amplifier comprises in particular a transistor T2. The output is connected to the probe by means of a capacitor C9 connected to an intermediate tap of a coil L2 of the tuned circuit C7–L2 of the amplifier so as to achieve a good impedance matching. The auxiliary line V and the connecting cable CL of the probe are connected to the output point A of this stage (the other output point being earthed).

The detection stage III comprises in particular a transistor T3 employed in the common collector manner and a detection resistor 58 and a detection capacitor C10 connected to the emitter of this transistor.

The low impedance output stage IV comprises a transistor T4 which permits the transmission of the continuous signal to the output terminal A1 which is adapted to be connected, for example, to an alarm device through a connection having if desired a great length for example several tens of meters without interference from outside influences picked up by the junction between the measuring box and the alarm case. Two diodes D1 and D2 are placed in the circuit of the emitter of the transistor T4 so as to compensate the thermic variation. The +12 and −12 terminals are fed by continuous voltages which may be supplied from the voltage source of the alarm device. They are decoupled by choke coils L4, L5 and capacitors C12, C13, C14, so as to block the oscillations coming from the oscillator. The terminal M is an earth terminal.

The characteristics of the main components mentioned hereinbefore and those of the other components not mentioned but clearly shown in the diagram, are indicated by way of example of one embodiment of the invention in the following table:

Capacitors

| | | | |
|---|---|---|---|
| C1 | (fixed) | pf | 100 |
| C2 | (fixed) | pf | 35 |
| C3 | (fixed) | pf | 180 |
| C4 | (fixed) | μf | 0.22 |
| C5 | (adjustable) | pf | 20 |
| C6 | (fixed) | μf | 0.22 |
| C7 | (fixed) | pf | 35 |
| C8 | (fixed) | pf | 180 |
| C9 | (fixed) | pf | 200 |
| C10 | (fixed) | pf | 1000 |
| C11 | (fixed) | pf | 1000 |
| C12 | (fixed) | μf | 0.22 |
| C13 | (fixed) | pf | 1000 |
| C14 | (fixed) | μf | 0.22 |

Wound resistances—¼ W

| | |
|---|---|
| R1 | 10KΩ |
| R2 | 3.9KΩ |
| R3 | 270Ω |
| R4 | 9.6KΩ |
| R5 | 3.9KΩ |
| R6 | 270Ω |
| R7 | 4.7KΩ |
| R8 | 22KΩ |
| R9 | 2.2KΩ |
| R10 | 390Ω |
| R11 | 2.2KΩ |
| R12 | 680Ω |
| R13 | 680Ω |

Transistors

| | |
|---|---|
| T1 | 2N2368 |
| T2 | 2N2368 |
| T3 | 2N2484 |
| T4 | 2N996 |

Coils

| | |
|---|---|
| L1 (oscillator) | 6 turns dia. 8/100. |
| L2 | 6 turns dia. 8/10 tapped at 1/3. |
| L3 (choke) | 47 μh. |
| L4 | 0.47 μh. |
| L5 | 47 μh. |

Crystal

| | |
|---|---|
| Q60 MHz. | T21184 |

Diodes

| | |
|---|---|
| D1 | 16P2 |
| D2 | 16P2 |

Figure 5:
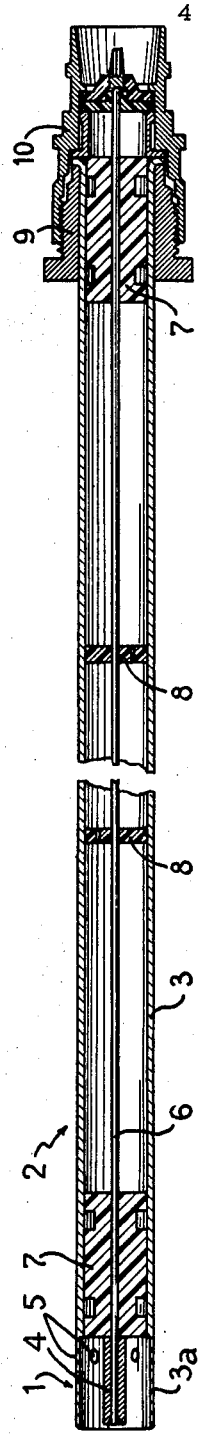

Embodiments of the probe and of the auxiliary line are shown in FIGS. 5 and 6.

The probe (FIG. 5) is of the capacitive type and comprises a cylindrical capacitor 1 extended by a rigid coaxial line 2. This probe is constructed of a copper tube 3 the end 3a of which is counterbored over a short portion of its length so as to form the outer plate of the capacitor 1, the inner plate of which consists of a cylindrical core 4 coaxial with the tube. Apertures 5 are provided radially in the outer plate 3a so as to allow the discharge from, or entry of air into, in the inner space of the capacitor when the oil enters or is discharged from this space. The core of the rigid coaxial line 2 consists of a copper wire having a diameter of 1 mm. supported and insulated by end washers 7 which afford a fluid-tight seal and intermediate washers 8 which are evenly spaced apart, for example by a distance of 5 cm. These washers 7 and 8 are preferably of the material known by the trade name of Teflon. The core 6 is connected to the inner armature 4 of the capacitor.

This probe is adapted to be disposed vertically. Its upper part is provided with a nut 9 carrying a coaxial C-type plug 10 to which a flexible coaxial line is connected.

This probe is fixed to the oil tank to be supervised by an adjusting flange provided with sealing elements. If it is intended to sense a drop in the oil level, the probe is disposed in such manner that the normal level of the oil is flush with the upper end of the capacitor, the dielectric of the capacitor then being constituted by the oil. When this level drops below the normal level, the oil dielectric is replaced partly or wholly by an air dielectric. The capacity of the capacitor can therefore vary between a maximum value corresponding to the normal level of the oil and a minimum value corresponding to a drop in the level equal to the height of the capacitor.

The length of the probe is determined by the depth of the tank above the level of the oil.

In one embodiment of the invention, the dimension of the various elements are as follows—

| Copper tube: | Mm. |
|---|---|
| Outside diameter | 10 |
| Inside diameter | 8 |
| Capacitor: | |
| Inside diameter of the outer plate | 9 |
| Outside diameter of the inner plate | 3 |
| Length of the plate | 12 |

The extreme values of the capacity of the capacitor are: 1.5 pf. and 2.5 pf.

The probe and the flexible coaxial line have an impedance on the order of 100 ohms.

The auxiliary coaxial line with adjustable short circuit (FIG. 6) is constructed in a copper tube 11 closed at both ends by a brass cap 12 and a plug 13 of a material known under the trademark of Teflon. A rigid coaxial steel core 14 comprises an end portion 14a which extends through the insulating plug 13 and is locked in position by a nut 15. The other end 14b of the core extends inside the tube into a cavity formed in a screw 16 the head of which is screwthreaded and is screwed in a tapped centre hole 17 in the cap 12, this screw thus centering and locking the core 14 in position. A brass slide 18 is slidably mounted on the core and can be locked in a fixed position by means of screws 19. It is provided with elastically yieldable contacts having silvered studs of which some, 20, rub against the core and others, 21, rub against the inner surface of the tube 11 so that this slide constitutes a short-circuit between the tube 11 and the core 14. The position of this slide can be adjusted by means of an actuating member 22 which is fixed to the slide by screws 23, this member extending through a longitudinal opening 24 on a generatrix of the tube 11. This line is gold plated so as to ensure a good HF conduction.

In one embodiment of the invention, the dimensions of the various elements are as follows—

| Copper tube: | Mm. |
|---|---|
| Outside diameter | 25 |
| Inside diameter | 21 |
| Steel core, diameter | 4 |
| Travel of the slide | 130 |

The impedance of this line is on the order of 100 ohms.

Of course, other values can be employed depending on the characteristics of the problem to be solved. In particular, tests carried out with a probe having a variable capacity of 8 pf. have permitted the utilization of a connecting cable 50 meters long. It must be understood also that the probe can be of the type having a variable inductance and that the device can be arranged not only for detecting variations in the variable impedance of the probe but also for measuring them, whereby the variations of another magnitude related to these variations of the impedance are measured.

Figure 8:
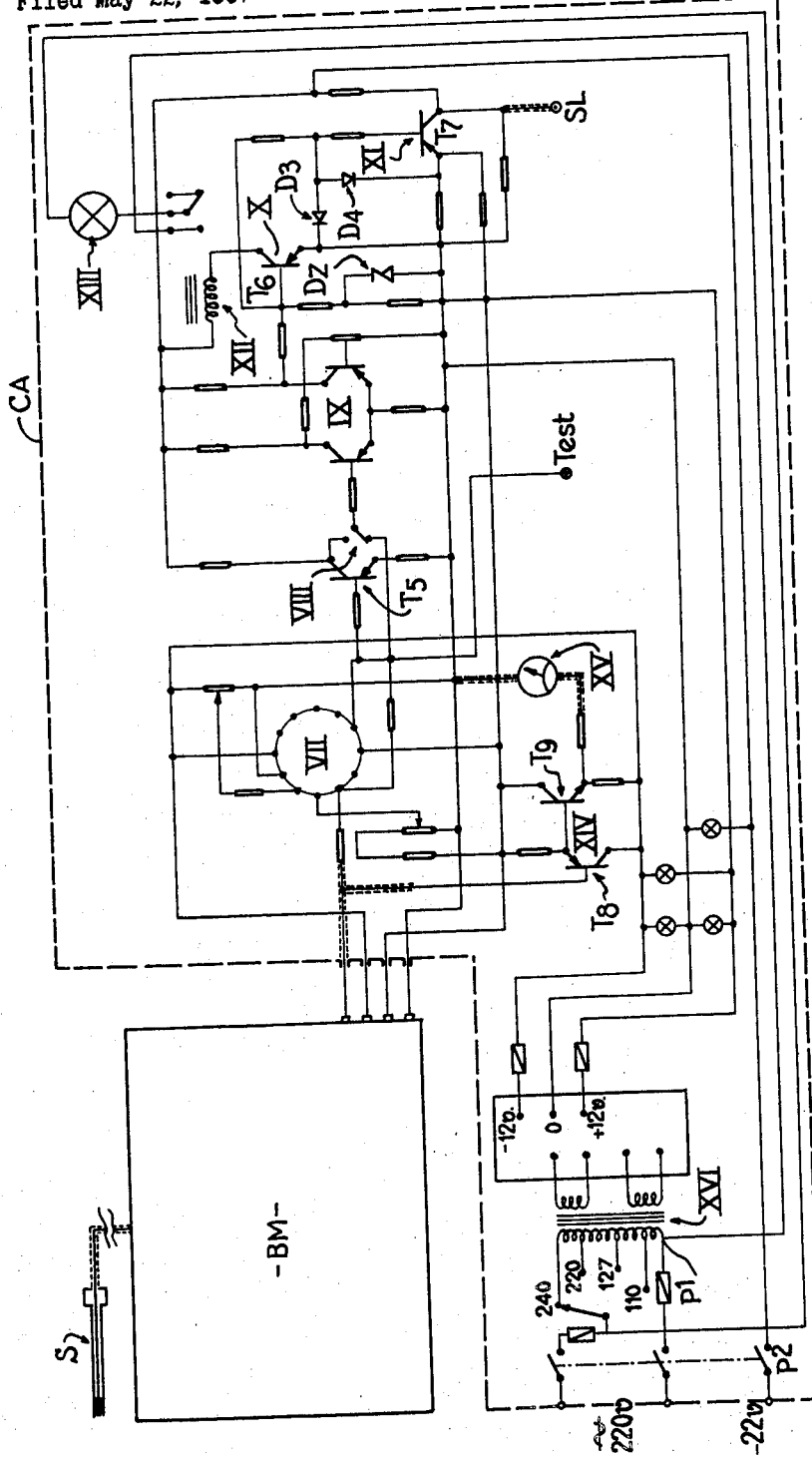
FIG. 8 is a detailed diagram of this apparatus.

This device can be combined with various other subassemblies so as to constitute measuring, supervising or alarm apparatuses, one example of which is shown generally in FIG. 7 and in a detailed diagrammatic form in FIG. 8.

This apparatus comprises the device shown in FIG. 4 represented by a "measuring box" BM which encloses the circuits I . . . IV shown in FIG. 4 and the auxiliary line V and on which is mounted the assembly VI constituted by the probe S with the connecting cable CL therefor. This box is connected by a single multi-conductor cable to an alarm case CA.

This alarm case comprises:

(a) A DC amplifier VII having a differential input constituted by an integrated circuit of the Amelco type having the commercial reference number A13251 receiving the signal from the measuring box by way of a shielded conductor constituting one of the conductors of the multi-conductor cable. This amplifier provides a gain of 10 obtained by a negative feedback, and a balance-voltage is employed for regulating the level of the output to zero value when the probe is in oil.

(b) An inverting stage VIII comprising a transistor T5 (FIG. 8) of type 2N526, for example, the gain of which is 10. This inverting stage effects a change in the function, that is to say, it permits operating the apparatus either when the level of the oil drops below a given level (detection of a leak) or when it rises above a given level (detection of an arrival of oil).

(c) A Schmitt circuit IX for selecting a very precise initiating threshold, the output signal of which, in opposition to a negative back-voltage furnished by a Zener diode DZ (FIG. 8), for example of the type 12Z4, is applied to a power amplifier X and to a logic circuit XI.

This power amplifier X comprises a transistor T6, for example of the type ASZ16. It feeds an industrial relay XII preferably comprising a plurality of reversing switches one of which is employed for feeding an alarm lamp XIII, the other switches being if desired employed for controlling a sound emitter, a motor, etc.

The logic circuit XI controlled by the Schmitt circuit furnishes at the output SL a continuous signal 0 or −22 v. the latter corresponding to the presence of a defect. The input of the transistor T7 of this circuit is protected from excessively high voltages or reverse voltages by two diodes D3 and D4. The output has a high impedance (on the order of 100KΩ).

This apparatus further comprises a matching stage XIV having a low impedance for a visual indicator XV consisting of a micro-ammeter. This stage comprises two transistors T8, T9 so as to be but slightly responsive to variations in temperature.

The voltages −12 v. and +12 v. are supplied by a supply unit XVI, disposed in the case CA and fed by the voltage of the mains. This voltage directly feeds the alarm lamp XIII and, if desired, the other elements controlled by the relay XII, by means of a plug P¹ (FIG. 8) provided on the primary winding of the transformer of the unit XVI. The elements fed at the voltage −22 v. are connected to an interior terminal P² to which a source of voltage of −22 v. can be connected.

The apparatus comprises in addition a "Test" plug employed for balancing the "Amelco" continuous amplifier signal lamps connected between the terminals 0 and −12 v., 0 and +12 v., −12 v., and +12 v., 0 and −22 v., regulating potentiometers and other components clearly shown in the diagram in FIG. 8.

This apparatus is employed and operates in a manner which will be clear from the foregoing description.

To utilize this apparatus, the continuous amplifier is balanced after checking and adjustment of the voltages +12 v., −12 v., and −22 v.

The regulation of the amplitude of the signal at the outlet of the measuring box is effected thereafter by connecting the probe and connecting a voltmeter to the output of the final stage then, with the capacitor of the probe in air, by trying to obtain a voltage maximum on said voltmeter by means of the adjustable short circuit line.

Preferably, when the maximum voltage has been found, the adjustment is moved slightly rearwardly so as to improve the sensitivity. Thereafter, the capacitor C5 of the amplifying-separating device is adjusted so as to obtain a certain voltage $V_a$ (for example 2 v.). Then, with the capacitor of the probe in oil, it is checked that the continuous output level has a value $V_b$ which is distinctly less than $V_a$; $V_b$ can be for example on the order of 1.4 v.

For regulating the case, it is first checked that the micro-ammeter supplies two extreme indications $I^a$ and $I^b$ which are distinctly separated ($I^a > I^b$) and respectively correspond to the two extreme states of the probe (capacitor in air and capacitor in oil). These two graduations can be for example 340 and 230. The balance-voltage is then regulated by acting on the corresponding potentiometer so as to obtain the 0 at the output of the continuous amplifier. Finally, with the function changing switch in the position corresponding to oil leakage detection, the Schmitt circuit is adjusted so as to obtain the actuation of the relay for continuous voltage at the input of the amplifier on the order of 1.7 in the aforementioned example, which corresponds to a graduation $I^c$ on the micro-ammeter which is approximately the mean between $I^a$ and $I^b$ (namely about 280 in the chosen example). The logic output is checked with an electronic voltmeter; the indication must be −22 v. in the case of a regulation defect.

When the apparatus is being used (the height of the probe with respect to the level to be detected being suitably adjusted, the connecting cables being connected and the supply voltages being applied), in the case of a drop in the oil level the capacity of the detecting or sensing capacitor decreases. When this level has dropped to the danger or warning value the relay XII is energized the lamp XIII lights up and other alarm devices are actuated if employed. The micro-ammeter XV constantly indicates the real level of the oil and it is possible to follow the slow variation in this level.

In the case of a lack of oscillation or a breakdown in the supply, the micro-ammeter indicates 0.

In the case of a short circuit of the probe, the micro-ammeter indicates a graduation lower than $I_b$ (for example 180 in the aforementioned example).

Although specific embodiments of the invention have been described, many modifications and changes may be made therein without departing from the scope of the invention.

Further, the invention is not intended to be limited by the various values indicated by way of example for certain of the components.

Having now described my invention what I claim as new and desire to secure by Letters Patent is:

1. A device for sensing and measuring variations in a physical quantity, for example a liquid level, comprising an alternating voltage generator, a probe having a variable impedance varying as a function of the variations in the quantity to be sensed, and being connected at one end of a connecting cable which connects it to the output of said generator, the range of variation in said variable impedance being small relative to the impedance of the cable and probe assembly, an auxiliary line connected to the output of said generator and having an adjustable impedance for increasing the variation range of the variable impedance of the assembly comprising said probe together with the cable thereof and said auxiliary line, said device further comprising means for measuring the voltage at the connection point of said assembly to said generator.

2. A device as claimed in claim 1, wherein the length of a line equivalent to said probe together with the connecting cable thereof is so chosen that when the variable impedance of said probe has the minimum value thereof the input impedance of said line is as low as possible.

3. A device as claimed in claim 1, wherein the impedance of said auxiliary line is so adjusted that when the variable impedance of said probe has the maximum value thereof the impedance of the assembly comprising said probe together with the cable thereof and said auxiliary line is as high as possible and consequently the voltage at the connection point of said assembly to said generator is as high as possible.

4. A device as claimed in claim 1, wherein the auxiliary line having an adjustable impedance comprises a conductive tube closed at one of the ends thereof, a coaxial conductive rod electrically connected to said closed end of said tube, and a slide having a body longitudinally slidable along said rod and constituting sliding contact means electrically connecting said tube to said rod, said sliding contact means comprising rubbing elements which are electrically connected to the body of the slide, some of said rubbing elements bearing in an elastically yieldable manner against said rod and the other of said rubbing elements bearing in an elastically yieldable manner against the inner surface of said tube.

5. A device as claimed in claim 1, for measuring the height of the level of a dielectric liquid in a tank, said probe comprising a conductive tube having a fixed length, a coaxial conductor insulated from said tube and a capacitor having fixed plates and a variable dielectric, said plates being constituted by an end portion of said tube and by a coaxial core connected to said coaxial conductor, said capacitor being open at the free end thereof so as to permit the entrance of said liquid between the plates and the discharge of said liquid and the substitution of air thereof.

6. A device as claimed in claim 5, wherein the length of the line equivalent to the probe together with the connecting cable therefor is so chosen that when the sensing capacitor is wholly immersed in said liquid the input impedance of said line is as low as possible.

7. A device as claimed in claim 5, wherein the impedance of said auxiliary line is so adjusted that when the sensing capacitor is wholly in air, the impedance of said assembly comprising said probe together with the cable therefor and said auxiliary line is as high as possible and consequently the voltage at the connection point of said assembly to said generator is also as high as possible.

8. An apparatus for supervising from a distance the level of a dielectric liquid in a tank comprising a sensing and measuring device according to claim 5 disposed in relation to the liquid at such height that when the level of said liquid in the tank is normal, the dielectric of the capacitor is constituted by the liquid in the tank whereas when said level drops, the liquid of the capacitor is progressively replaced by air, said apparatus comprising means for sensing and measuring the variation in the impedance of the probe resulting from the change in the nature of the dielectric, and means for converting said variation into a signal when the level of the liquid in the capacitor drops below a given value.

9. A device as claimed in claim 1, wherein said generator comprises a high-frequency oscillator and an amplifying-separating stage connected to the output of said generator so as to amplify the output of said oscillator and to match its output impedance, said device further comprising a detection stage connected to the output of said amplifying-separating stage, an output stage connected to the output of said detection stage for the transmission of a continuous signal, a continuous negative feedback amplifier connected to the output of said output stage, a function inverting device for permitting operation of the device either when the liquid level drops below a given value or when it rises above a given value, the output of said inverting device being connected through a Schmitt circuit and a power amplifier to a logic circuit, the output signal of said Schmitt circuit, in opposition to a back-voltage supplied by a Zener diode being applied to said power amplifier and to said logic circuit, said power amplifier feeding a relay controlling an alarm when the measured impedance exceeds a predetermined limit value, and said logic circuit emitting either a zero signal or a continuous voltage.

10. A device as claimed in claim 1, wherein said generator comprises a high-frequency oscillator and an amplifying-separating stage connected to the output of said generator so as to amplify the output of said oscillator and to match its output impedance, said device further comprising a detection stage connected to the output of said amplifying-separating stage, an output stage connected to the output of said detection stage for the transmission of a continuous signal, a continuous negative feedback amplifier connected to the output of said output stage, a function inverting device for permitting operation of the device either when the liquid level drops below a given value or when it rises above a given value, the output of said inverting device being connected through a Schmitt circuit and a power amplifier to a logic circuit, the output signal of said Schmitt circuit, in opposition to a back-voltage supplied by a Zener diode being applied to said power amplifier and to said logic circuit, said power amplifier feeding a relay controlling operating means, when the measured impedance exceeds a predetermined limit value and said logic circuit emitting either a zero signal or a continuous voltage.

References Cited

UNITED STATES PATENTS 2,622,442   12/1952   De Boisblanc et al. ____ 73—304
2,866,336   12/1958   Hitchcox _____ 73—304

DONALD O. WOODIEL, Primary Examiner